United States Patent [19]
Geipel

[11] 3,815,927
[45] June 11, 1974

[54] GASKET STRUCTURE AND METHOD OF MANUFACTURE

[75] Inventor: Stanley W. Geipel, Bedminster, N.J.

[73] Assignee: Metallo Gasket Co., New Brunswick, N.J.

[22] Filed: Nov. 24, 1972

[21] Appl. No.: 309,133

[52] U.S. Cl.................. 277/180, 277/204, 277/235
[51] Int. Cl............................................. F16j 15/00
[58] Field of Search ............. 277/11, 180, 204, 235

[56] References Cited
UNITED STATES PATENTS

| | | | |
|---|---|---|---|
| 1,943,122 | 1/1934 | Kinzel.................................. | 277/11 |
| 2,339,479 | 1/1944 | McCreary........................... | 277/180 |
| 2,462,762 | 2/1949 | Nardin................................. | 277/11 |
| 2,474,790 | 6/1949 | Rossman.............................. | 277/11 |

Primary Examiner—Samuel B. Rothberg
Attorney, Agent, or Firm—Dunham, Cooper, Clark, Griffin & Moran

[57] ABSTRACT

A centering device for a spiral-wound gasket, comprising a thin, flat metal plate having an aperture for receiving the gasket, wherein an aperture-surrounding edge portion of the plate is bent to form a continuous grooved lip, projecting on each side of the plate, for securely holding a circumferential bead on the gasket with opposite faces of the gasket disposed in planes respectively spaced from opposite sides of the plate. A solid metal O-ring may be mounted in the plate, in spaced concentric relation to the gasket, for limiting compression of the gasket when the gasket is clamped, e.g., between facing pipe flanges. An annular retaining ring carrying another similar O-ring may be mounted within the inner periphery of the gasket. To assemble the device with a gasket, the lip is first formed by bending operations; the gasket is then inserted, and the lip is clamped around the gasket bead.

9 Claims, 11 Drawing Figures

PATENTED JUN 11 1974 3,815,927

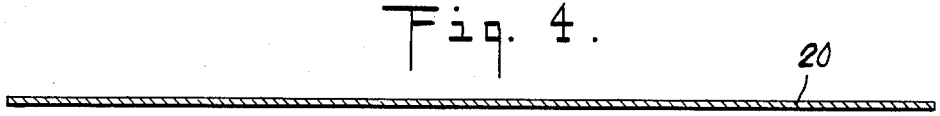
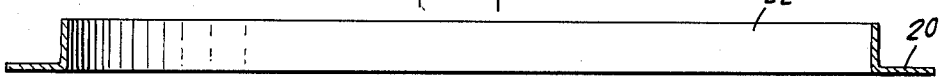
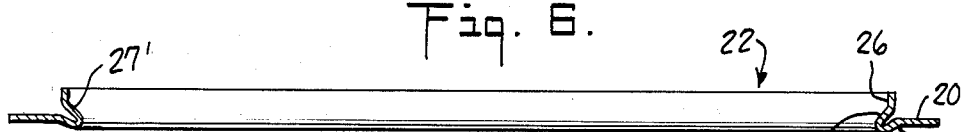
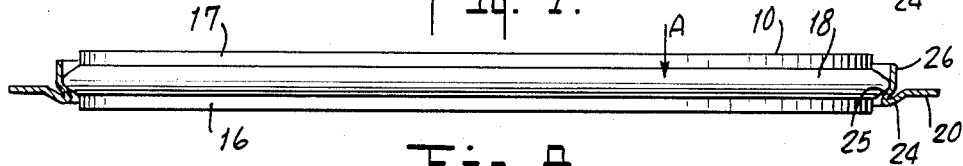
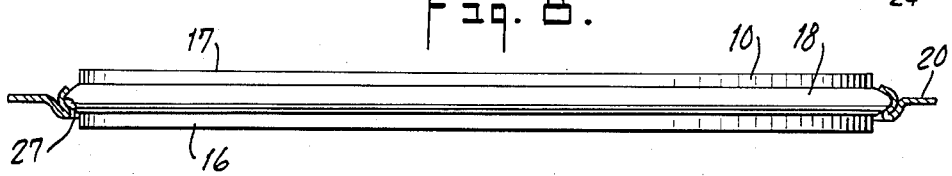
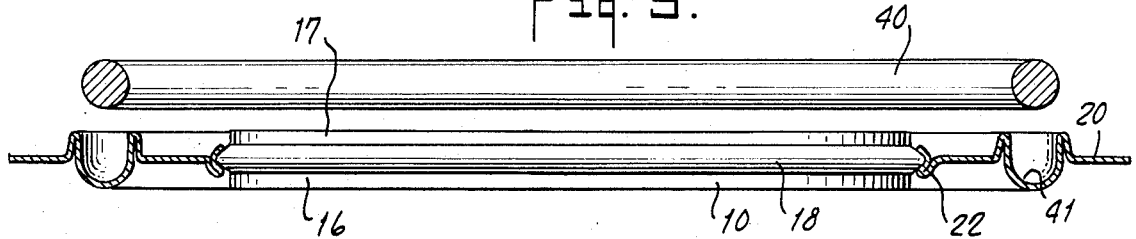
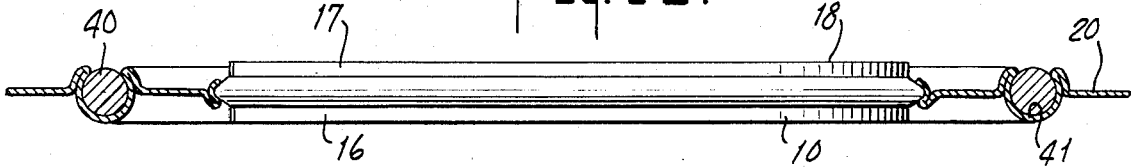
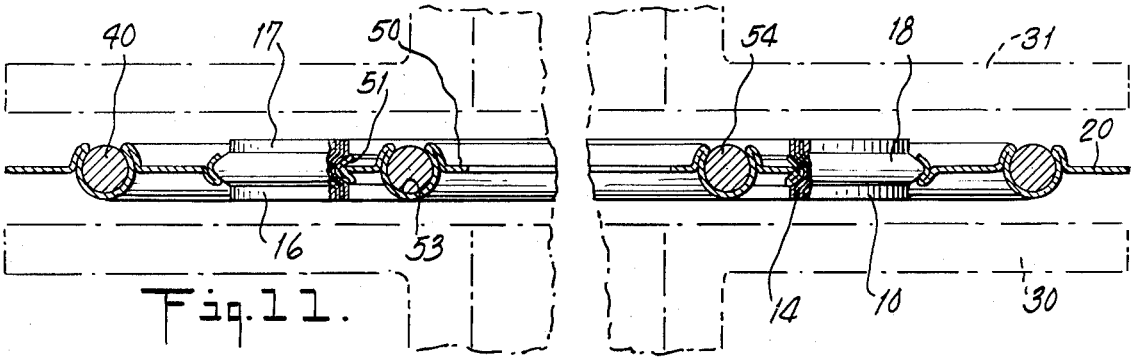

3,815,927

GASKET STRUCTURE AND METHOD OF MANUFACTURE

BACKGROUND OF THE INVENTION

This invention relates to gasket structures including new and improved devices for holding spiral-wound gaskets, and to methods of making such structures.

One conventional form of gasket, e.g., for use with steam pipes and the like comprises a spirally wound strip of a metal such as stainless steel having a longitudinal channel, with a layer of asbestos or other filler material interposed between successive turns of the spiral. Gaskets of this type are herein termed spiral wound gaskets. Commonly, the innermost and outermost turns of the metal strip are secured by spot welding, and the channel of the strip opens inwardly, i.e., toward the center of the gasket, so that the channel of the outermost turn of the strip forms in effect a circumferential, outwardly projecting bead. A spiral wound gasket as thus constituted is an annulus having opposed, flat gasket faces, and is compressible, e.g., when pressed between facing pipe flanges, to provide a fluid-tight seal at a joint between adjacent pipe sections.

Customarily, a spiral wound gasket is mounted in a positioning member such as a retaining or centering ring or plate which holds the gasket, as and after it is put into place, in properly centered relation to the pipe sections or other structures with which it is used. One known form of such centering device comprises a relatively thick metal ring having a groove or channel in its inner edge to accommodate the circumferential bead of the gasket. The thick body of the ring aids in limiting compression of the gasket, but requires an uneconomically large amount of metal; and the device presents other problems of fabrication and assembly as well. Various alternative centering devices have been proposed for use with spiral wound gaskets, but these alternative structures, also, are in general characterized by various drawbacks, e.g., complexity or difficulty or manufacture, and/or failure to hold the gasket with adequate security against moving or snapping out of the retainer.

SUMMARY OF THE INVENTION

The present invention broadly contemplates provision of a centering device, for a spiral wound gasket, comprising a flat, thin metal plate having an aperture dimensioned to receive the gasket, and an annular aperture-surrounding edge portion bent to form a lip for receiving the circumferential bead of the gasket. Specifically, in accordance with the invention the edge portion of the plate includes a first, inwardly bent annular leg projecting from one side of the plate; a second, reversely bent annular leg disposed inwardly of the first leg; and a third, inwardly bent annular leg projecting from the second leg on the other side of the plate and cooperating with the second leg to define an inwardly opening annular groove for receiving and securely holding the bead of the gasket with the opposed faces of the gasket lying in planes respectively spaced from opposite sides of the plate. The terms "inwardly" and "outwardly" as used herein refer to directions, respectively, toward and away from the center of the gasket-receiving aperture.

In preparing the described device and assembling it with a gasket, in accordance with the invention, a gasket-receiving aperture is first cut in a metal plate and the aperture-surrounding edge portion of the plate is subjected to successive bending or forming operations to produce the aforementioned lip comprising first, second and third annular leg portions, the free edge of the third leg of this lip having a diameter sufficiently large to enable insertion of the gasket therethrough. The gasket is then inserted within the lip, which is subsequently crimped or pressed around the bead of the gasket so as to grip the gasket securely.

In accordance with further features of the invention, the lip of the centering plate as finally formed and pressed around the gasket bead projects on each side of the plate but for a distance substantially less than the spacing between the adjacent major surface of the plate and the plane containing the gasket face on that side of the plate, so that the gasket projects farther than the lip on each side of the plate. Consequently, the gasket may be substantially compressed in use without interference or resistance to such compression by the lip. Additionally, the vertex of the groove of the lip (and hence the bead of the gasket gripped therein) lies in a plane substantially coincident with the centering plate, to provide centered support of the gasket by the plate and thereby to maximize the effectiveness of the plate in holding the gasket against displacement or dislodgement from the plate.

The invention, as thus embodied in the described thin-plate centering device, the assembly of a spiral-wound gasket therewith, and the method of making such assembly, affords important advantages, e.g., in respect of economy of material used in a centering device as compared with a conventional thick-ring centering device. Other advantages of the invention include superior ease of fabrication and assembly, and superior effectiveness of the centering device (having a lip in press-fitted engagement with the gasket bead) in holding the gasket securely against dislodgement.

As a still further feature of the invention, an annular recess may be formed in the centering plate in spaced concentric relation to the lip, and a substantially incompressible O-ring (e.g., fabricated of solid steel wire) may be inserted and clamped within the groove for limiting compression of the gasket held by the plate when the gasket is pressed between facing pipe flanges or the like. The cross-sectional diameter of the O-ring wire is selected to provide a combined thickness of O-ring and plate of predetermined magnitude, less than the uncompressed thickness of the gasket, serving a compression-limiting function similar to that afforded by a conventional thick-ring device but, again, with economy of material used. To provide additional compression-limiting effect, and also to afford positive restraint of the inner turns of the spiral-wound gasket against release and consequent displacement, an annular thin-plate retaining ring having another similar O-ring inset therein may be mounted within the gasket, i.e., in secure engagement with the inner periphery thereof.

Further features and advantages of the invention will be apparent from the detailed description hereinbelow set forth, together with the accompanying drawings.

BRIEF DESCRIPTION OF THE DRAWINGS

FIG. 4 is a cross-sectional view of a metal plate blank from which a centering device in accordance with the present invention may be formed;

FIG. 5 is a view similar to FIG. 4 showing a first stage in the formation of a centering device from the blank of FIG. 4, in accordance with the invention;

FIG. 6 is a view similar to FIG. 5, showing a second stage in formation of the centering device;

FIG. 7 is a view similar to FIG. 6, illustrating insertion of a spiral gasket in the partly formed centering device of FIG. 6;

FIG. 8 is a view similar to FIG. 7, illustrating the crimping or pressing of the lip of the centering device of FIG. 7 around the bead of the gasket inserted therein;

FIG. 9 is a view similar to FIG. 8, showing a centering device holding a gasket and having a recess for receiving an O-ring, the O-ring being also shown in FIG. 9 in position for insertion in the recess;

FIG. 10 is a view similar to FIG. 9, showing the structure of FIG. 9 after the O-ring is inserted and clamped in the recess; and FIG. 11 is another similar view of the structure of FIG. 10 further including a retaining ring mounted on the inner periphery of the gasket.

DETAILED DESCRIPTION

Figure 1:
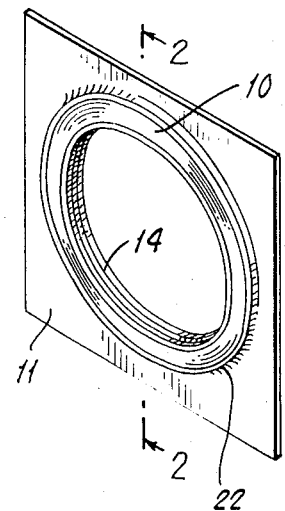
FIG. 1 is a perspective view of a gasket structure comprising a spiral-wound gasket and a centering plate, embodying the present invention in a particular form.
Figure 2:
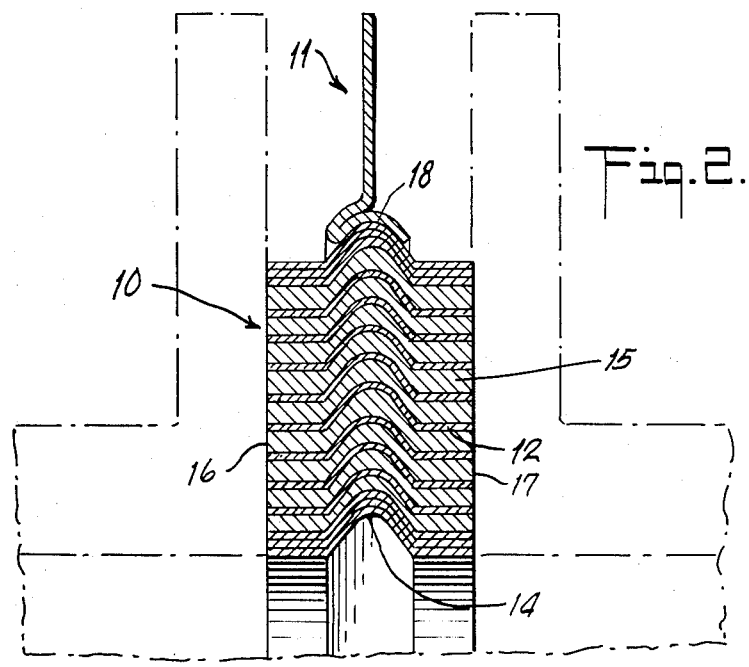
FIG. 2 is an enlarged, fragmentary cross-sectional view of the device of FIG. 1, taken along the line 2—2 of FIG. 1.

Referring first to FIGS. 1 and 2, the structure of the invention is illustrated as embodied in an assembly including a spiral-wound gasket 10 of generally conventional character, and a centering device 11 incorporating particular features of the invention.

The gasket 10 comprises a thin continuous strip 12 of a suitable metal having a continuous, centrally disposed longitudinal channel 14, and a thin continuous strip 15 of a compressible filler material, wound together in a tight spiral (wherein the filler strip 15 is interposed between successive turns of the metal strip 12) so as to form an annular gasket with opposed, substantially planar, parallel gasket faces respectively designated 16 and 17. The channel 14 of strip 12, as thus wound, opens inwardly (toward the central opening defined by the annular gasket); consequently, the convex reverse side of the channel projects outwardly, from the outermost turn of the strip 12, as a continuous circumferential bead 18 extending around the outer periphery of the gasket and disposed midway between the planes of gasket faces 16 and 17. As further shown in FIG. 2, the filler strip 15 does not extend between the two or three innermost turns of the strip 12; hence these turns of the metal strip are in metal-to-metal contact with each other, and they are secured together by spot welding to prevent unwinding of the gasket at the inner periphery. Similarly, the two or three outermost turns of strip 12 are not separated by the filler strip, but are in metal-to-metal contact with each other and are, again, secured against unwinding by spot welds.

Merely as one illustrative example of a spiral-wound gasket as shown at 10, the metal strip 12 may be a strip of stainless steel about 0.008 inch thick, and the filler strip 15 may be a strip of asbestos (or other suitable material, e.g., a fluorocarbon resin such as that commercially available under the trade name "Teflon") about 0.015 inch thick, wound to provide a gasket having an uncompressed thickness (i.e., spacing between opposite faces 16 and 17) of 0.175 ± 0.005 inch, such gasket being adapted to be compressed in use to a thickness of 0.130 ± 0.005 inch. Of course, other materials and dimensions may be employed in the gasket 10.

In accordance with the invention, the centering device 11 comprises a thin metal plate 20 defining a central aperture for receiving the gasket 10, and having an aperture-surrounding annular edge portion bent to form a lip 22 for holding the gasket in place. This lip, which is integral with plate 20, includes a first, inwardly bent annular leg 24 projecting to one side of the plate 20; a second, reversely bent annular leg 25 disposed inwardly of leg 24; and a third, inwardly bent annular leg 26 projecting from leg 25 on the other side of plate 20 and cooperating with leg 25 to define an inwardly opening annular groove 27 for receiving and holding the bead 18 of the gasket 10. The lip 22 is pressed or crimped smoothly and uniformly around bead 18 to grip the gasket securely.

As best seen in FIG. 2, the lip 22 is so disposed that the vertex of groove 27 lies in a plane substantially coincident with the plate 20, for holding the gasket 10 in centered relation to the plate, i.e., with the opposite gasket faces 16 and 17 lying in planes respectively spaced (substantially equidistantly) from the opposite major surfaces of plate 20. Lip 22 projects on each side of plate 20 but for a distance less than the spacing between the plate major surface and the plane of the adjacent gasket face. In other words, the dimension of the lip 22 in a direction transverse to the plate major surfaces is less than the uncompressed thickness of the gasket, and indeed preferably less than the intended compressed thickness of the gasket; for example, in the case of a gasket intended to be compressed to a thickness of 0.130 ± 0.005 inch, the transverse dimension of the lip is preferably less than that value.

This configuration and disposition of the lip 22 provides balanced support for the gasket 10 on each side of the plate, and avoids interference of the lip with compression of the gasket. These advantages, as will be understood, may be realized in substantial measure even if the vertex of groove 27 is displaced somewhat to one side of plate 20, so long as the lip projects on each side of the plate and so long as the extent of such projection, on either side of the plate, is less than the distance between the plate surface and the plane containing the gasket face on that side of the plate.

Again simply for the sake of example, with a gasket having the exemplary dimensions set forth above, the centering device 11 may be fabricated of cold rolled steel plate having a thickness of about 0.019 inch.

In use, the structure of FIG. 1 may be placed between facing flanges 30 and 31 of pipe sections 32 and 33 shown in phantom outline in FIG. 2, and the pipe sections may then be moved toward each other so that the flanges 30 and 31 (respectively bearing against the opposite gasket faces 16 and 17) compress the gasket 10 transversely to form a fluid-tight seal between the pipe sections. The gasket is shown in FIG. 2 as it appears prior to such compression. Preferably, the inner diameter of the gasket 10 is slightly (e.g., ¼ inch) larger than the inner diameter of the adjacent pipe sections.

Figure 3:
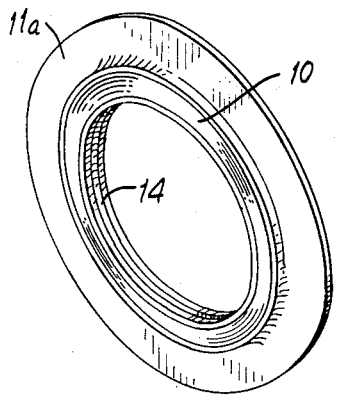
FIG. 3 is a perspective view of a gasket structure similar to that of FIG. 1 but showing a centering plate having a different peripheral configuration.

The centering device 11, in the manner of known centering devices heretofore used for spiral-wound gaskets, serves to facilitate positioning and holding the gasket in properly centered relation to the pipe sections. The configuration of the outer periphery of the device 11 (i.e., the outer edge of plate 20) is selected, in accordance with the specific use to which the gasket is to be put, for conformity and cooperation with the adjacent structural elements with which it will be associated in such use. Thus in FIG. 1 the outer periphery of the device 11 is of square configuration as desired for certain particular purposes. However, the device may have any desired alternative external peripheral configuration; for example, there may be provided a centering device 11a as shown in FIG. 3, identical to the device 11 of FIG. 1 but having a circular external periphery as preferred for other applications.

Successive stages in fabrication and assembly of the structure of FIG. 1 are illustrated in FIGS. 4 – 8. Thus, in a flat metal (e.g., steel) plate 20 (FIG. 4), there is formed a central circular aperture 21 (FIG. 5) dimensioned to receive a spiral-wound gasket 10; and as further shown in FIG. 5, the annular edge portion of the plate 20 surrounding aperture 21 is bent upwardly at a right angle to the major surfaces of the plate to form a projecting lip 22'.

The annular edge portion of the plate 20 is then subjected to further shaping operations to produce the configuration shown in FIG. 6. Specifically, an annular portion of the plate 20 immediately surrounding lip 22' may be bent downwardly (in the direction opposite to that in which lip 22' projects) as indicated at 35 in FIG. 6 so as to form the first leg 24 of lip 22, and the initially formed lip 22' may be shaped to provide the second and third legs 25 and 26 of lip 22, i.e., by imparting a centrally disposed annular bend to the initially formed lip 22'; thus the legs 25 and 26 define a shallow, inwardly opening groove having its vertex at 27'. This bend, designated 27' in FIG. 6, is at this stage disposed to one side of plate 20. Also, the inner diameter of the free edge or rim of leg 26 (at the stage shown in FIG. 6) is sufficiently large to accommodate the bead 18 of gasket 10, although the inner diameter of the opposite rim of the lip 22 (i.e., the bend 24' at the junction of legs 24 and 25) is less than the outer diameter of bead 18. As will be understood by those skilled in the art, the shaping and forming operations illustrated in FIGS. 5 and 6 may be performed in ways, and with equipment, generally conventional for shaping flanged circular metal edges.

The gasket 10 is now inserted into the lip 22, i.e., past the free edge of leg 26, in the direction indicated by arrow A in FIG. 7. The bead of the gasket bears against leg 25.

Once the gasket is in place, the legs 25 and 26 are pressed or crimped around the bead 18 (again, in a way and with equipment that may be conventional for such pressing or crimping operations) so as to engage the bead snugly and securely on both sides of plate 20 and around the entire circumference of the gasket 10. As shown in FIG. 8, incident to this pressing or crimping step, the lip 22 may be somewhat further displaced so that the aforementioned bend 27' (which becomes the vertex of the groove 27 of lip 22) is disposed in a plane substantially coincident with the plate 20. This operation completes the fabrication and assembly of the gasket and centering device structure.

Referring to FIGS. 9 and 10, the structure just described may, in accordance with the invention, be provided with means for limiting compression of the gasket, i.e., when the gasket is disposed and pressed between facing pipe flanges or the like. Such means, adapted to engage, and to resist gasket-compressing movement of, surfaces (e.g., of facing pipe flanges) substantially uniformly around the circumference of the gasket, is shown in FIGS. 9 and 10 as comprising a solid and substantially incompressible O-ring 40, e.g., fabricated of steel wire.

As illustrated in FIG. 9, for holding the O-ring 40, an annular recess 41 is formed (e.g., by generally conventional metal-forming operations) in the plate 20 in outwardly spaced concentric relation to the lip 22. The O-ring 40 (which has a diameter equal to the diameter of recess 41) is placed within recess 41, and the edges of the recess are forced together sufficiently to clamp the O-ring 40 in place, as illustrated in FIG. 10. This is to say, the plate 20 is subjected to minor deformation providing this clamping action.

The transverse dimension of O-ring 40 (i.e., the cross-sectional diameter of the steel wire forming the ring) is selected to provide a predetermined combined thickness of the plate 20 and O-ring, less than the uncompressed thickness of the gasket 10. For instance, in the example of gasket and plate dimensions set forth above, the O-ring thickness may be such that the combined thickness of the plate and O-ring is 0.119 ± 0.006 inch. By way of illustration, when the gasket and plate assembly including the O-ring is placed between facing pipe flanges and the flanges are pressed together, the compression-limiting means comprising the O-ring and the associated portion of the plate engages the facing flanges to prevent further compressing movement thereof when the gasket has been compressed to a desired extent. In this way, excessive compression of the gasket is avoided by a simple and convenient structure that may be readily fabricated with advantageous economy of material. The precise location of the O-ring in relation to the gasket, is selected with reference to the particular use to be made of the gasket, and the shape and dimensions of associated elements, to provide this desired compression-limiting effect.

While the assembly of the O-ring with the plate 20 is shown in FIGS. 9 and 10 as performed subsequent to the assembly of the plate with the gasket, the O-ring may be inset in the plate (by the illustrated procedure) prior to assembly of the plate with the gasket.

As a still further particular feature of the invention, in a specific aspect thereof, a retaining ring 50 (FIG. 11) may be mounted on the periphery of the gasket, i.e., in the assembly including the plate 20. Ring 50, which may be fabricated, e.g., of cold rolled steel of the same gauge as that used for plate 20, has an outer peripheral lip 51 shaped to be snugly received within the inwardly opening channel 14 that extends around the inner periphery of the gasket 10. A function of the retaining ring 50 is to secure the innermost turns of the gasket 10 positively against loosening or unwinding during use.

In addition, ring 50 may have an annular recess 53 disposed in inwardly spaced concentric relation to the lip 51 and securely holding a supplemental means for limiting compression of the gasket, comprising a further metal O-ring 54, e.g., identical in thickness to the O-ring 40 described above. When the retaining ring 50 including O-ring 54 is used in combination with plate 20 and O-ring 40, the O-ring 54 cooperates with the O-ring 40 in limiting compression of facing surfaces between which the gasket is clamped. These surfaces are represented by the pipe flanges 30 and 31 shown in phantom outline in FIG. 11. The diameter of the inner periphery of retaining ring 50 is selected to be larger than the inner diameter of adjacent pipe sections which which the gasket is used.

It is to be understood that the invention is not limited to the features and embodiments hereinabove specifically set forth but may be carried out in other ways without departure from its spirit.

I claim:

1. Gasket structure comprising
   a. a spiral-wound annular gasket having spaced, opposed gasket faces and an outwardly projecting bead extending around the outer periphery of the gasket and centrally disposed therein intermediate said faces; and
   b. a flat metal plate substantially thinner than said gasket, having an aperture dimensioned to receive said gasket, and in which said gasket is disposed;
   c. said plate having an annular edge portion surrounding said aperture and including
      i. a first, inwardly bent annular leg projecting from one side of said plate,
      ii. a second, reversely bent annular leg disposed inwardly of said first leg; and
      iii. a third, inwardly bent annular leg projecting from said second leg on the other side of said plate and cooperating with said second leg to define an inwardly opening annular groove receiving and securely holding the bead of said gasket with the opposed gasket faces lying in planes respectively spaced from opposite sides of said plate.

2. Structure as defined in claim 1, wherein said annular edge portion projects, on each side of said plate, for a distance substantially less than the spacing between said plate and the plane containing the gasket face on that side of said plate.

3. Structure as defined in claim 1, wherein said groove lies in a plane substantially coincident with said plate.

4. Structure as defined in claim 1, further including stop means carried by said plate for limiting compression of said gasket in a direction transverse to the faces thereof when said gasket is clamped between facing surfaces, said stop means being adapted to engage and resist gasket-compressing movement of the facing surfaces substantially uniformly around the circumference of said gasket.

5. Structure as defined in claim 4, wherein said stop means comprises at least one substantially incompressible element disposed for abutment with the facing surfaces to arrest gasket-compressing movement thereof, said element having a thickness less than the thickness of said gasket.

6. Structure as defined in claim 5, wherein said plate has an annular recess formed therein in concentric, outwardly spaced relation to said annular edge portion, and wherein said substantially incompressible element comprises an O-ring fixedly clamped by said plate within said recess, said plate and said O-ring having a combined thickness less than the thickness of said gasket.

7. Structure as defined in claim 6, further including a retaining ring comprising a flat annular metal plate engaged with and projecting inwardly from the inner periphery of said gasket, said retaining ring having an annular recess disposed in concentric, inwardly spaced relation to said gasket; and a second substantially incompressible O-ring fixedly clamped by said retaining ring within said last-mentioned recess, said retaining ring and said second O-ring having a combined thickness less than the thickness of said gasket.

8. A centering device for a spiral-wound annular gasket having spaced, opposed gasket faces and an outwardly projecting bead extending around the outer periphery of the gasket and centrally disposed thereon intermediate said faces, said device comprising
   a. a flat metal plate substantially thinner than said gasket, having an aperture dimensioned to receive said gasket;
   b. said plate having an annular edge portion surrounding said aperture and including
      i. a first, inwardly bent annular leg projecting from one side of said plate,
      ii. a second, reversely bent annular leg disposed inwardly of said first leg, and
      iii. a third, inwardly bent annular leg projecting from said second leg on the other side of said plate and cooperating with said second leg to define an inwardly opening annular groove for receiving and securely holding the bead of said gasket in a position in which the opposed faces of said gasket lie in planes respectively spaced from opposite sides of said plate.

9. Structure as defined in claim 8, wherein said plate has an annular recess formed therein in concentric, outwardly spaced relation to said annular edge portion, and further including a substantially incompressible O-ring fixedly clamped by said plate within said recess.

* * * * *